United States Patent [19]

Chasseguet et al.

[11] Patent Number: 4,889,218

[45] Date of Patent: Dec. 26, 1989

[54] TORSION-DAMPING FLYWHEEL

[75] Inventors: Gustave Chasseguet, Taverny; Jacques Paquin, Villeneuve-la-Garrenne, both of France

[73] Assignee: Valeo, Paris, France

[21] Appl. No.: 218,997

[22] Filed: Jul. 14, 1988

[30] Foreign Application Priority Data

Jul. 15, 1987 [FR] France .................. 87 09920
Jul. 15, 1987 [FR] France .................. 87 09921

[51] Int. Cl.⁴ .............................................. F16D 3/14
[52] U.S. Cl. .............................. 192/106.2; 192/106.1; 74/574; 464/68
[58] Field of Search .................. 192/106.2, 106.1; 74/574; 464/68

[56] References Cited

U.S. PATENT DOCUMENTS

| | | | |
|---|---|---|---|
| 4,274,524 | 6/1981 | Nakane | 192/106.2 |
| 4,727,767 | 3/1988 | Aiki et al. | 192/106.2 |
| 4,729,464 | 3/1988 | Friedmann | 192/70.17 |
| 4,732,250 | 3/1988 | Maucher et al. | 464/68 |
| 4,777,843 | 10/1988 | Bopp | 192/106.2 |

FOREIGN PATENT DOCUMENTS

| | | |
|---|---|---|
| 3642877 | 7/1987 | Fed. Rep. of Germany ... 192/106.2 |
| 2166604 | 8/1973 | France . |
| 2571461 | 4/1986 | France . |
| 2577643 | 8/1986 | France . |
| 2587775 | 3/1987 | France . |
| 3427163 | 4/1986 | Netherlands . |
| 2171494 | 8/1986 | United Kingdom . |

Primary Examiner—Rodney H. Bonck
Assistant Examiner—Andrea Pitts
Attorney, Agent, or Firm—Charles E. Brown; Charles A. Brown

[57] ABSTRACT

A torsion damping flywheel, particularly for fitting to the clutch of a motor vehicle, has two parts mounted for relative rotational movement about a common axis including an output part comprising two discs forming part of a torque limiter which define externally two guiding flanges housing springs for controlling the relative movement of the two parts. The arrangement simplifies the flywheel by reducing the number of component parts and the axial space requirement.

7 Claims, 2 Drawing Sheets

TORSION-DAMPING FLYWHEEL

BACKGROUND OF THE INVENTION

1. Field of the Invention

The invention relates to a torsion-damping flywheel, particularly for a motor vehicle, of the kind comprising two parts mounted for relative rotational movement about a common axis, and circumferentially acting springs interposed between these two parts. The invention relates more especially to an improvement making it possible to reduce the axial space requirement of the springs and to facilitate assembly.

2. Description of the Related Art

In a motor vehicle, a torsion-damping flywheel of the kind referred to above is conventionally provided between the crankshaft and the input shaft of the gearbox, in order to filter out the vibrations which arise over the whole length of the kinematic chain extending between the engine and the drive shafts. Advantageously, such a torsion damping flywheel is associated with the clutch, and in this case, the output assembly may comprise a solid annular plate constituting the thrust plate of the clutch. The input part, connected to the crankshaft, conventionally carries the starter ring gear for engagement with the engine starter. Such an inertial flywheel is described for example in French Pat. No. 2 571 461.

One of the objects of the invention is to simplify a device of this kind and, in particular, to reduce the number of its component parts, while reducing its overall axial space requirement.

SUMMARY

With this in mind, the invention provides a torsion damping flywheel comprising two parts mounted for relative rotational movement about a common axis, namely an input part connected to a driving shaft, and an output part, and springs interposed between said parts to generate a circumferentially-directed damping action, said output part comprising a hub and two discs forming part of a torque limiter disposed between two flat annular bearings, characterised in that the two discs are arranged to define, in a radial direction and externally relative to said torque limiter, two guiding flanges spaced relative to each other and in which there are disposed the openings accommodating said springs, and wherein a single annular flange, engaged between the two discs and cooperating with the said springs, is attached to an inertial plate of the said input part by assembly means located externally relative to said springs.

The invention in particular arises from the finding that the friction liners of the torque limiter undergo practically no wear during the service life of the damping flywheel and, in consequence, the spacing between the two discs may be considered as being constant, making these two elements capable of holding the springs in all circumstances. Furthermore, it follows from the preceding definition that the axial space requirement of the damping flywheel is reduced, all other things being equal, since there is only one flange, cooperating with the springs, linked to the inertial plate. Indeed, the openings for the springs can be of smaller diameter, since the rear recess has a smaller aperture for receiving the single flange. Accordingly, the springs may also have a smaller diameter.

Moreover, the inertial plate which is connected to the engine crankshaft is selected as a function of the characteristics of the engine. It is therefore desirable that the inertial plate should be adapted for mounting separately from the other parts of the damping flywheel, especially since it is sometimes necessary to test the engine uncoupled from the kinematic links and equipped only with this inertial mass. All this could not be envisaged before now, because of the complexity of the shock-absorber mechanism as a whole, comprising the springs, the friction means and the torque limiter. Some of these elements run the risk of being mislaid or being damaged before or during assembly. The invention also makes it possible to overcome this difficulty.

With this object in view, the invention also comprehends a torsion damping flywheel as defined above, which is characterised in that it comprises a sub-assembly joined to the inertial plate and comprises in particular the flange, the springs, the hub and the torque limiter including the two discs and the thrust plate. This sub-assembly, which comprises both elements associated with the said first part and elements associated with the said second part, is designed in a manner such that its component elements cannot easily be detached from each other. The thrust plate can be changed subsequently after mounting of the sub-assembly.

DESCRIPTION OF THE PREFERRED EMBODIMENTS

Figure 1:
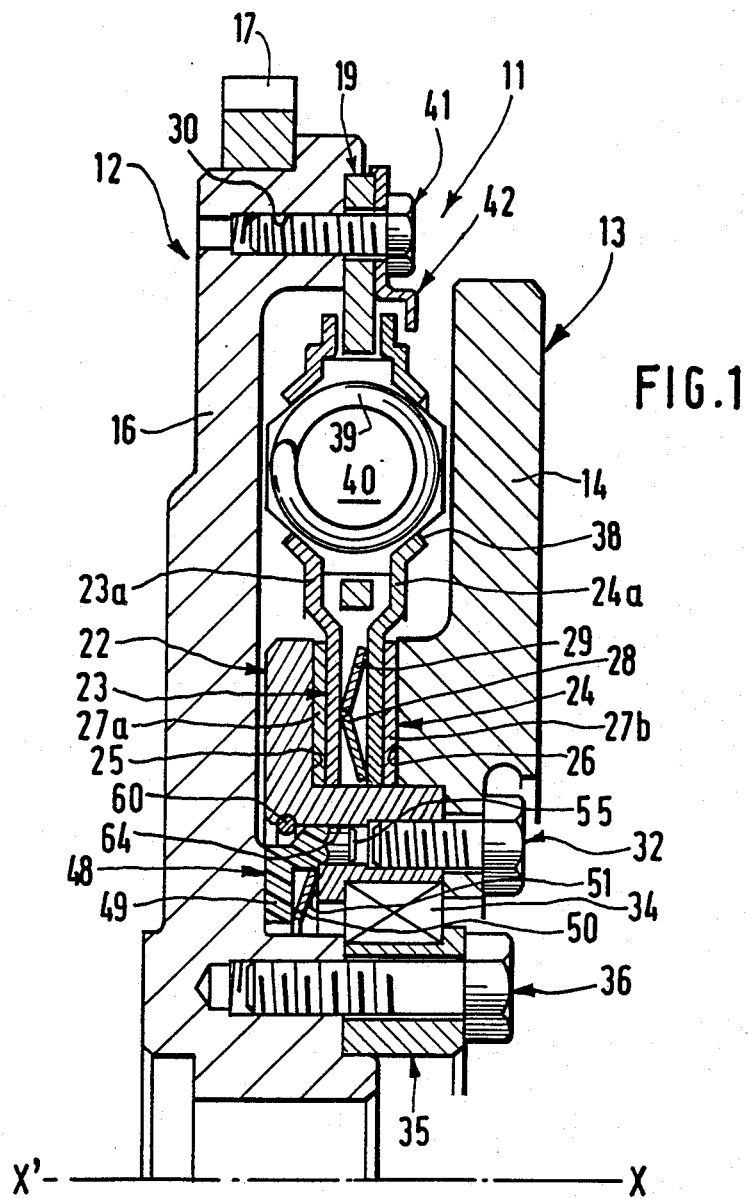
FIG. 1 shows a damping flywheel in radial section.

The damping flywheel 11 essentially comprises two parts 12, 13 mounted for relative rotational movement about a common axis x,x'. The drawing shows an input part 12 connected directly to a driving shaft (not shown), such as the crankshaft of an internal combustion engine, and an output part 13, which in this case includes a solid disc 14 forming the thrust plate of a clutch. The input part 12 is primarily constituted by a disc-shaped inertial plate 16, carrying the starter ring gear 17, and by a single annular flange 19. The output Part comprises, in addition to the disc 14, a hub 22 and two discs 23, 24 being part of a torque limiter the elements of which are axially interposed between a first annular bearing 25 comprising a collar of hub 22 and a flat second annular bearing 26 on the disc 24. More particularly, this torque limiter, known per se, comprises an axial assembly constituted by a first friction liner 27a, which is flat, cooperating with the annular bearing face 25, and disc 23; two springs 28, 29 acting in the axial direction and forming here Belleville-type spacers; and disc 24 and a second friction liner 27b, also flat, cooperating with the annular bearing face 26. The second friction liner 27b is cemented to the disc 24, so that the dismantling or replacement of the disc 14 can be carried out safely, without any risk of escape of the liner. The disc 14 forming the thrust plate is attached to the hub 22 by screws 32. This hub is fastened to the external cage of a ballbearing 34, the internal cage of which is supported by a shoulder ring 35 fastened coaxially to the inertial plate 16 by means of screws 36. The discs 23, 24 are adapted to define, radially and externally relative to the torque limiter (that is to say, relative to the assembly formed by the elements described above), two guiding flanges 23a, 24a spaced relative to each other, in which are disposed the openings 38 accommodating the springs 39 arranged so as to act in circumferential direction between the input part 12 and the output part 13.

These springs are each mounted between two sockets 40, articulated to the edges of the openings 38, as described in the above-mentioned prior patent. The single flange 19 is engaged and interposed between the two discs. It comprises members cooperating with the springs, through the intermediary of the sockets and is fastened to the inertial plate 16 by screws 41 located externally relative to the springs 39. These screws are mounted in threaded bores 30 of the inertial plate.

Owing to the fact that the flange 19 is single, it is possible to reduce the size of the openings of the sockets and, consequently, to reduce the diameter of the springs 39, and thereby the axial space requirement of the inertial flywheel.

It is clearly apparent at this stage of the description that the damping flywheel is designed to comprise a sub-assembly connectable to the inertial plate and to constitute a unit adapted to be constructed and mounted independently of this inertial plate. In particular, the mounting of the inertial plate and the mounting of this sub-assembly may be carried out at separate stations, providing the possibility of testing the inertial plate independently of the kinematic links. This sub-assembly, the elements of which cannot accidentally detach themselves from each other, comprises: the flange 19, the springs 39 and the sockets 40, the hub 22, the torque limiter including the two discs 23, 24 and finally the ball bearing 34. Retaining clamps 42 are fixed to flange 19 and adapted to prevent the axial escape of the disc 24 (that is to say, of the disc most remote from the inertial plate 16) during the mounting of the device or in the course of an operation involving the dismantling of the disc 14 constituting the thrust plate. These clamps 42 can be mounted simply by interposition between the flange 19 and the heads of some of the screws 41. Preferably they are directly joined to this flange by welding or riveting. The mounting of the sub-assembly defined above can be facilitated if the flange 19 is equipped with positioning studs (not visible in the drawing) parallel to the x'x-axis and engaging with corresponding holes in the inertial plate 16.

The disc 14, constituting the thrust plate of the clutch, is not necessarily a part of the sub-assembly described above (it could be a hindrance in the mounting of the sub-assembly). In most cases, the plate is mounted by means of the screws 32, after assembly of the sub-assembly with the inertial plate 13. Because of this, the thrust plate can subsequently be changed without difficulty in case of deterioration or wear.

Dry friction means 48 are also part of the sub-assembly mentioned above. These friction means, provided to act along the full length of the angular interface of the two parts of the damping flywheel, are disposed between the hub 22 and the inertial plate 16. They comprise a continuous friction ring 49 made of a synthetic material, and a spring 50, shown here in the form of a Belleville collar. A retaining member 60 is mounted in an annular groove formed in the cylindrical surface 64 of the hub 22, against which the ring 49 is guided for axial sliding movement, and this member cooperates with an inclined surface of the ring 49. This inclined surface prevents the member 60 from disengaging from its groove under the action of collar 50 prior to the mounting of the sub-assembly on the inertial plate 16. It will be noted that, owing to the presence of member 60 acting as an abutment, the friction means 48 are properly attached to the sub-assembly, the collar 50 being locked fast between the ring 49 and a face 51 of the hub, whilst the ring 49 has extensions 55 axially slidably engaged in the unthreaded portions of at least some of the holes 64 which receive the screws 32.

Figure 2:
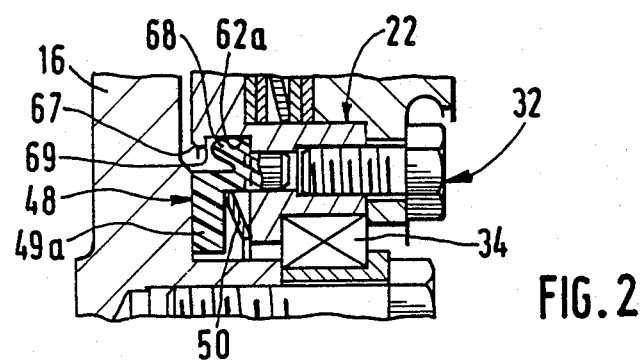

In the variant of FIG. 2, the ring 49 has a flexible, moulded lip 68, which is engaged in a groove 62a of hub 22. Prior to mounting, the lip 68 abuts against the shoulder 69, whilst during mounting the lip 68 retracts on passing the sloping portion 67 to straighten up thereafter. The friction ring 49 is therefore not separable from the hub 22.

Figure 3:
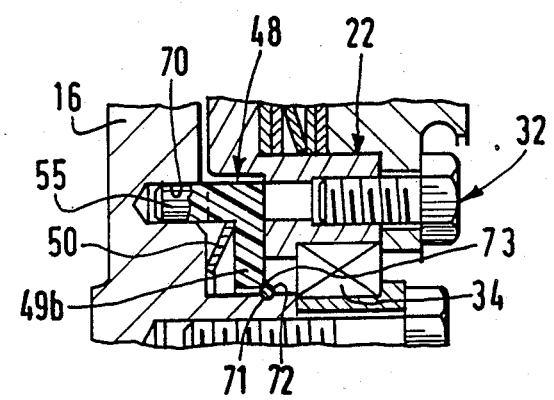

In the variant of FIG. 3, the friction means can be attached to the inertial plate 16, the ring 49b having extensions 55 slidably engaged in bores 70 of plate 16.

The Belleville collar 50 or, in a variant, a corrugated collar, is interposed between the plate 16 and the collar 49b, while a member 71, engaged in a groove 72 of the plate 16, serves as retaining means by cooperating with an inclined stop 73.

Figure 4:
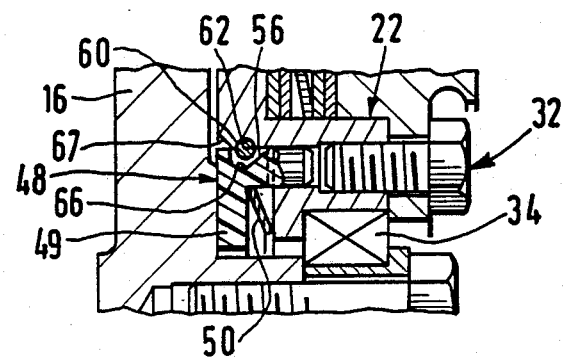
FIGS. 2, 3 and 4 show details of the friction means for different variants.

In the variant of FIG. 4, the retaining member 60 can be mounted partly in a groove of the hub and partly in a groove of ring 49. During assembly it is brought into contact with the bearing 67, being caused to contract in the groove 66 and then to expand.

In all cases, the retaining means (56, 60) are adapted to limit the axial play of the friction means, so that the latter remain fast with the part to which they are contacted prior to assembly or after dismantling of the two parts.

Moreover, in order to avoid incrustation phenomena by the springs 39 in the faces of the flange 19, the flange is advantageously subjected to a hardening treatment in at least those of its zones which are located in the proximity of these springs. Such a treatment may for example consist of nitriding or a localized high-frequency hardening. It will be noted that the single flange is of a simple form, without stampings.

What is claimed is:

1. A torsion damping flywheel comprising two parts mounted for relative rotational movement about a common axis, said parts comprising respectively an input part connected to a driving shaft, and an output part; and springs interposed between said parts adapted to control circumferentially the relative movement; said output part comprising a hub and two discs associated with a torque limiter disposed between two flat annular bearings, said discs defining radially, externally relative to said torque limiter, two guiding flanges spaced relative to each other and in which there are provided openings accomodating said springs; a single annular flange being engaged between the two discs for cooperation with said springs and being fastened to an inertial plate of said input part by assembly means disposed externally relative to said springs.

2. A torsion damping flywheel according to claim 1, wherein said flange, said springs, said hub and the said torque limiter including the two discs and a plate of said output part is defined as a sub-assembly, said sub-assembly is joined to said inertial plate.

3. A torsion damping flywheel according to claim 2, wherein said plate of said output part is a thrust plate of a clutch, and is connected to said hub of said sub-assembly by means of screws.

4. A torsion damping flywheel according to claim 3, wherein said torque limiter comprises an axial assembly comprising, between one annular bearing which is fast with said hub and a second annular bearing defined on said thrust plate a first friction liner, one of said discs, at least one elastic means with axial action in the form of a Belleville collar, the other said disc, and a second friction liner.

5. A torsion damping flywheel according to claim 4, wherein said second friction liner is fixed to the disc adjacent thereto.

6. A torsion damping flywheel according to claim 1, wherein retaining clamps are fastened to said flange, said clamps being operable to prevent the axial escape of that disc which is the most remote axially from said inertial plate.

7. A torsion damping flywheel according to claim 1, wherein said friction means are provided in contact with one of said parts under the action of elastic means and linked in rotation with the other part with means for permitting relative axial play, wherein the retaining means are disposed to limit the axial play of said friction means in such a manner that they remain fast with the part with which they are linked for rotation, prior to assembly or after dismantling of said two parts.

* * * * *